United States Patent
Zhao (10) Patent No.: US 10,503,206 B2
(45) Date of Patent: Dec. 10, 2019

(54) TRIGGER MECHANISM AND CLEANING DEVICE WITH THE TRIGGER MECHANISM

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Qian-Fa Zhao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 381 days.

(21) Appl. No.: 15/603,418

(22) Filed: May 23, 2017

(65) Prior Publication Data
US 2017/0344063 A1     Nov. 30, 2017

(30) Foreign Application Priority Data

May 26, 2016 (CN) .......................... 2016 1 0365521

(51) Int. Cl.
| | |
|---|---|
| A47L 9/28 | (2006.01) |
| G06F 1/16 | (2006.01) |
| H02J 7/00 | (2006.01) |
| A47L 7/00 | (2006.01) |
| G06F 17/00 | (2019.01) |
| G06F 3/02 | (2006.01) |

(52) U.S. Cl.
CPC .......... *G06F 1/1632* (2013.01); *A47L 7/0085* (2013.01); *A47L 9/2821* (2013.01); *A47L 9/2836* (2013.01); *A47L 9/2857* (2013.01); *G06F 1/1626* (2013.01); *H02J 7/0044* (2013.01); *A47L 2201/00* (2013.01); *G06F 3/02* (2013.01); *G06F 17/00* (2013.01)

(58) Field of Classification Search
CPC .. A47L 2201/00; A47L 7/0085; A47L 9/2821; A47L 9/2836; A47L 9/2857; G06F 1/1626; G06F 1/1632; H02J 7/0044
USPC ............. 361/679.41; 379/441; 439/660, 668; 455/575.1; 710/304, 303
See application file for complete search history.

(56) References Cited

U.S. PATENT DOCUMENTS

| | | | |
|---|---|---|---|
| 8,373,661 B2 * | 2/2013 | Lan ..................... | G06F 3/03548 345/156 |
| 8,634,883 B2 * | 1/2014 | Hong ..................... | H01R 13/60 455/575.1 |

(Continued)

*Primary Examiner* — Joseph J Hail
*Assistant Examiner* — Arman Milanian
(74) *Attorney, Agent, or Firm* — ScienBiziP, P.C.

(57) ABSTRACT

A cleaning device connects to a mobile device through an interface. The cleaning device includes a trigger mechanism which includes at least one plate body, two elastic members connect to the plate body, and a baffle mechanism resting on the plate body. The baffle mechanism comprises at least one baffle, a torsion spring, and a processing unit. The baffle defines a first elastic sheet and the plate body defines a second elastic sheet. When a pressure is applied on the mobile device, the plate body is driven to rotate the baffle to make the first elastic sheet on the baffle contact the second elastic sheet on the plate body. The processing unit produces a trigger signal to execute a function of function modules when the first elastic sheet contacts the second elastic sheet.

18 Claims, 7 Drawing Sheets

(56) References Cited

U.S. PATENT DOCUMENTS

| | | | | |
|---|---|---|---|---|
| 2011/0159923 A1* | 6/2011 | Raffle | .................... | H04M 1/04 |
| | | | | 455/557 |
| 2012/0149444 A1* | 6/2012 | Yuan | ..................... | H04M 1/04 |
| | | | | 455/575.1 |
| 2012/0162902 A1* | 6/2012 | Zhou | ................... | H01R 13/635 |
| | | | | 361/679.41 |
| 2012/0304432 A1* | 12/2012 | Wang | ................... | G06F 1/1626 |
| | | | | 29/281.3 |

* cited by examiner

TRIGGER MECHANISM AND CLEANING DEVICE WITH THE TRIGGER MECHANISM

CROSS-REFERENCE TO RELATED APPLICATIONS

This application claims priority to Chinese Patent Application No. 201610365521.6 filed on May 26, 2016, the contents of which are incorporated by reference herein.

FIELD

The subject matter herein generally relates to trigger mechanism and cleaning device which can be controlled by the trigger mechanism.

BACKGROUND

Smart phone has more and more functions. For example, the smart phone can have the function of starting or closing air conditioner and more functions are available.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "comprising" means "including, but not necessarily limited to"; it specifically indicates open-ended inclusion or membership in a so-described combination, group, series, and the like.

Exemplary embodiments of the present disclosure will be described in relation to the accompanying drawings.

Figure 1:
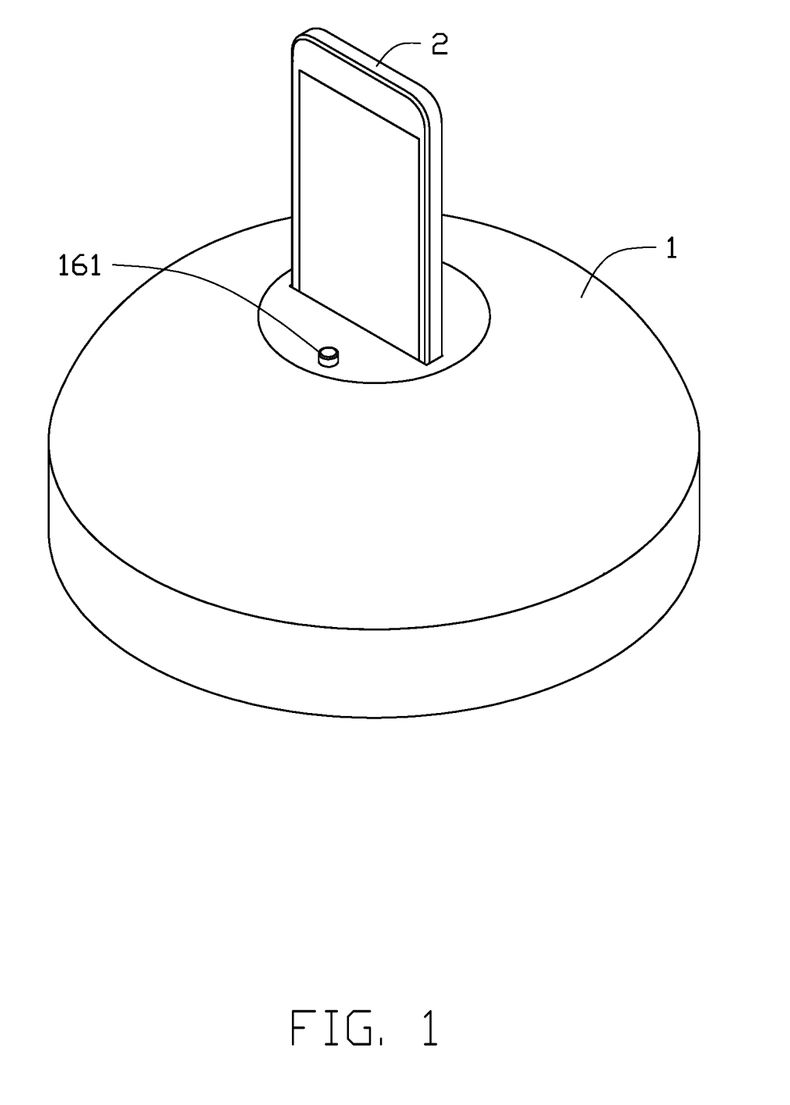
FIG. 1 is an isometric view showing an exemplary embodiment of a cleaning device.
Figure 2:
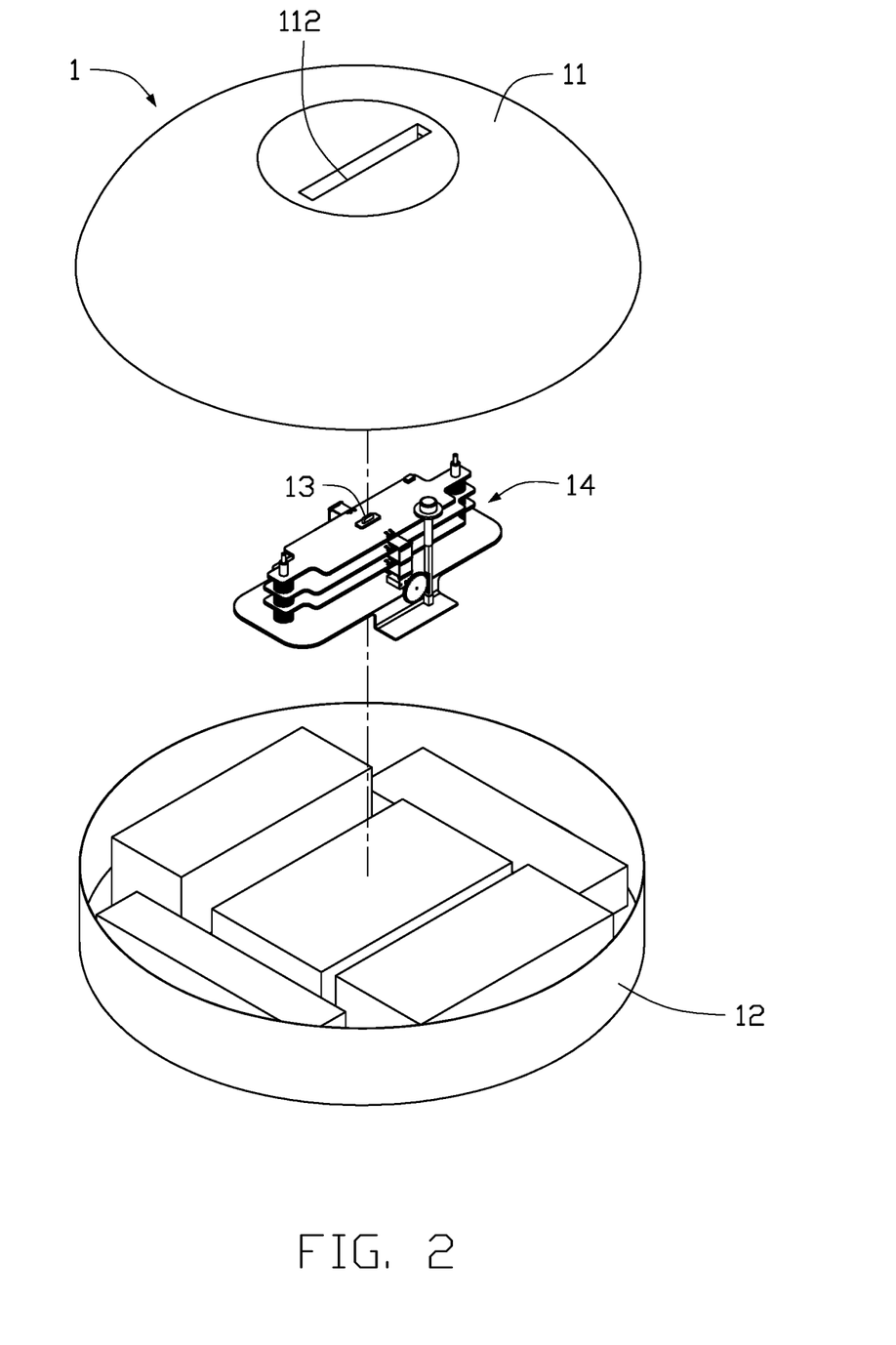
FIG. 2 is an exploded, isometric view of the cleaning device of FIG. 1.

FIG. 1 illustrates an isometric view of a cleaning device 1. A mobile device 2 connects to the cleaning device 1 and controls the cleaning device 1. In at least one embodiment, the mobile device 2 can be a smart phone, a tablet computer, or a wearable device. FIG. 2 illustrates an exploded, isometric view of the cleaning device 1. The cleaning device 1 includes, but is not limited to, a top cover 11, a bottom cover 12, an interface 13, a trigger mechanism 14, a number of function modules 15, and a processing unit 18 (referring to FIG. 3). The top cover 11 is set on the bottom cover 12. The trigger mechanism 14 is received in the bottom cover 12. The interface 13 is mounted on the trigger mechanism 14. The top cover 11 defines a socket 112. The mobile device 2 connects to the interface 13 through the socket 112. When the mobile device 2 connects to the interface 13, the mobile device 2 can be pressed to trigger the processing unit 18 to execute functions of the function modules 15. In at least one embodiment, the processing unit 18 can be a central processing unit (CPU), a microprocessor, or other data processor chip that performs functions of the function modules 15.

Figure 4:
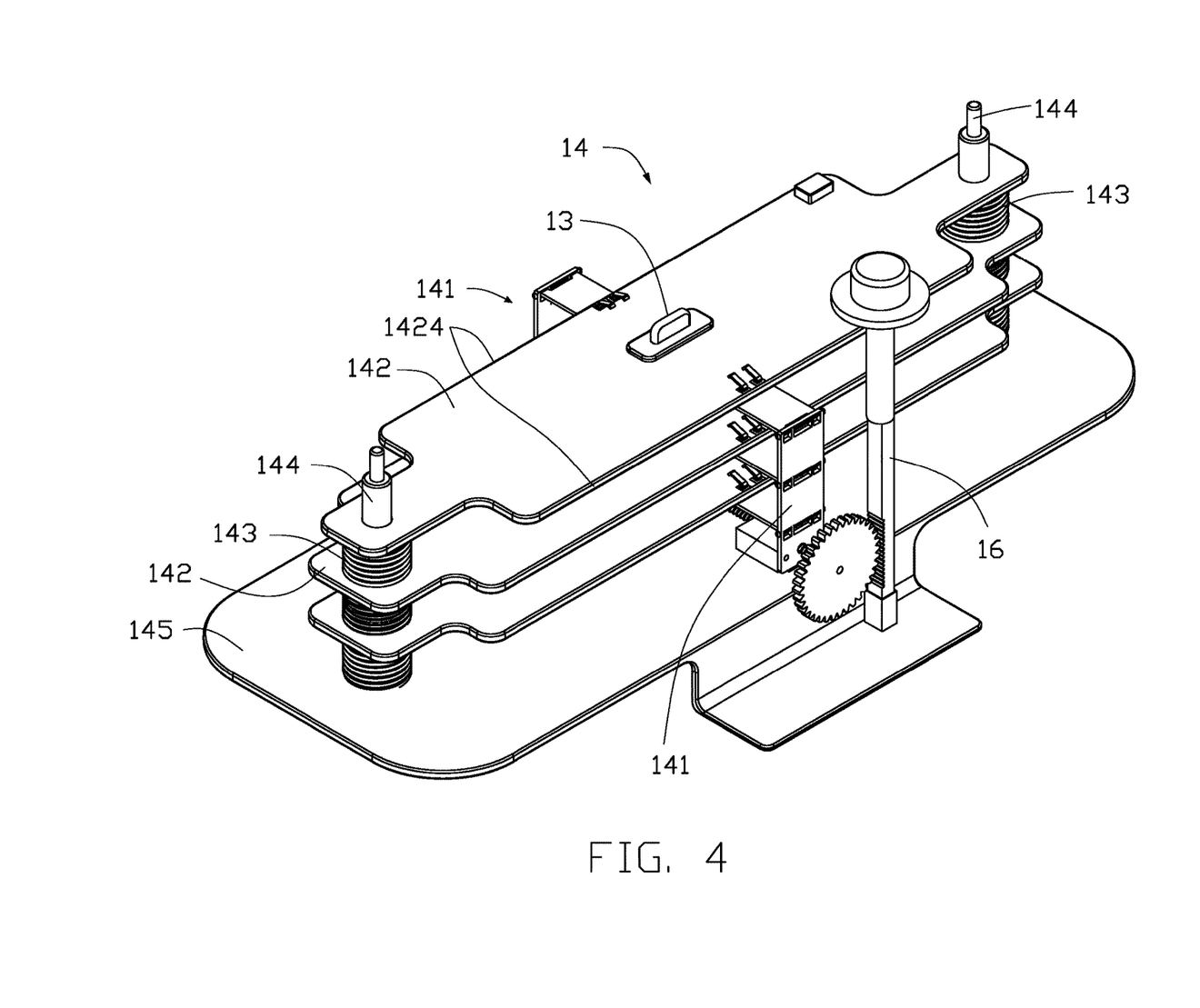
FIG. 4 is an isometric view showing an exemplary embodiment of a trigger mechanism used in the cleaning device of FIG. 1.

FIG. 4 illustrates the cleaning device 1 of FIG. 1. The trigger mechanism 14 includes at least one baffle mechanism 141, at least one plate body 142, at least two elastic members 143, two guide pins 144, and a bottom plate 145. The interface 13 is mounted on the at least one plate body 142. The two guide pins 144 connect to the top cover 11 and the bottom plate 145. The at least one plate body 142 is sleeved on the two guide pins 144 and is located between the two guide pins 144. One end of each elastic member 143 connects to one plate body 142, and the other end of each elastic member 143 connects to the bottom plate 145. The two guide pins 144 are used to guide the plate body 142 to move along the guide pins 144. Each elastic member 143 is used to provide elastic resistance or restoring force for the at least one plate body 142 when the at least one plate body 142 moves along the guide pins 144. In at least one embodiment, the elastic member 143 is a spiral spring. In at least one embodiment, the number of the plate bodies 142 is three, the number of the elastic members 143 is six, the elastic members 143 are sleeved on the guide pin 144, and each plate body 142 is laminated on the bottom plate 145 through two elastic members 143.

Figure 5:
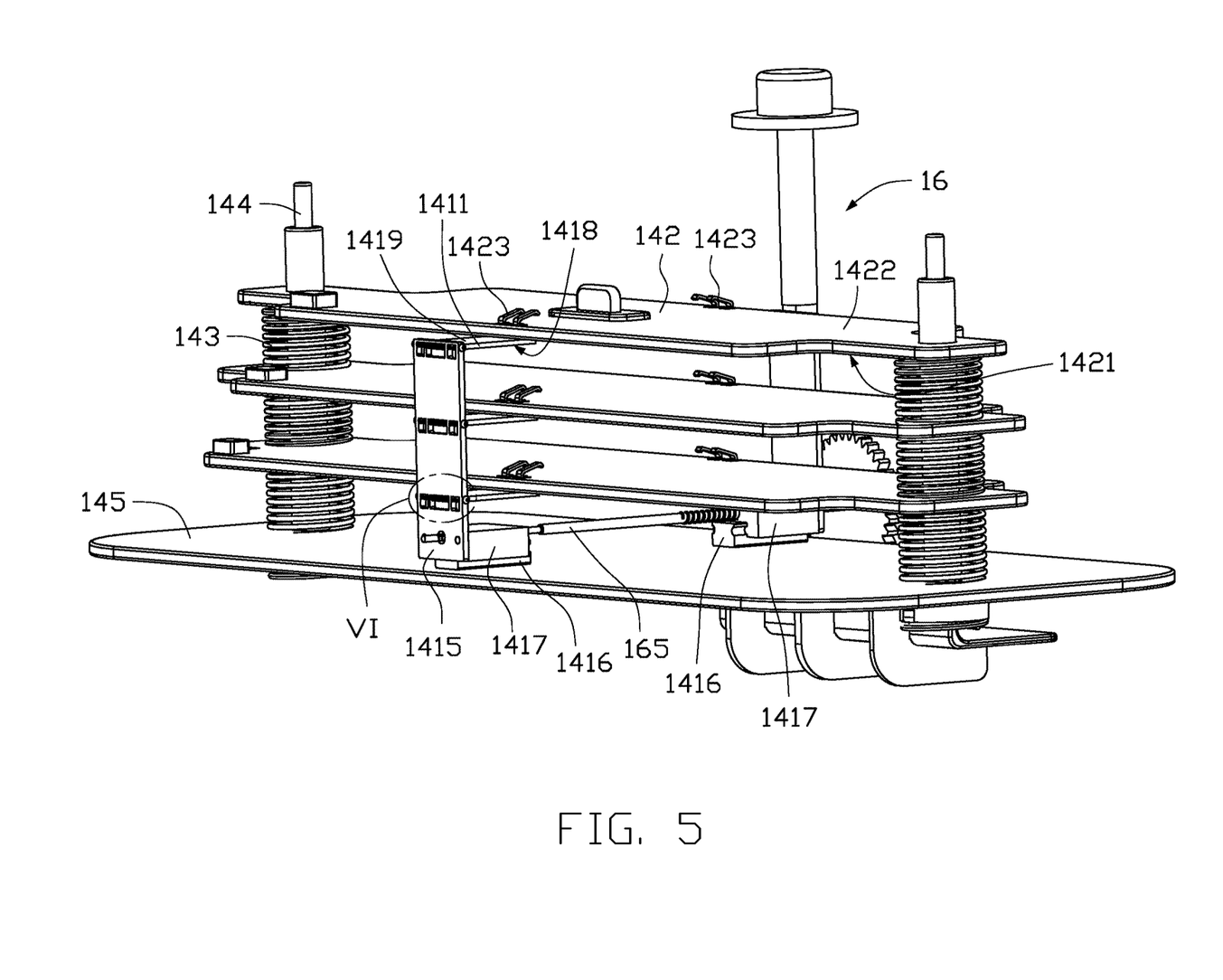
FIG. 5 is a second view of the trigger mechanism of FIG. 4.
Figure 6:
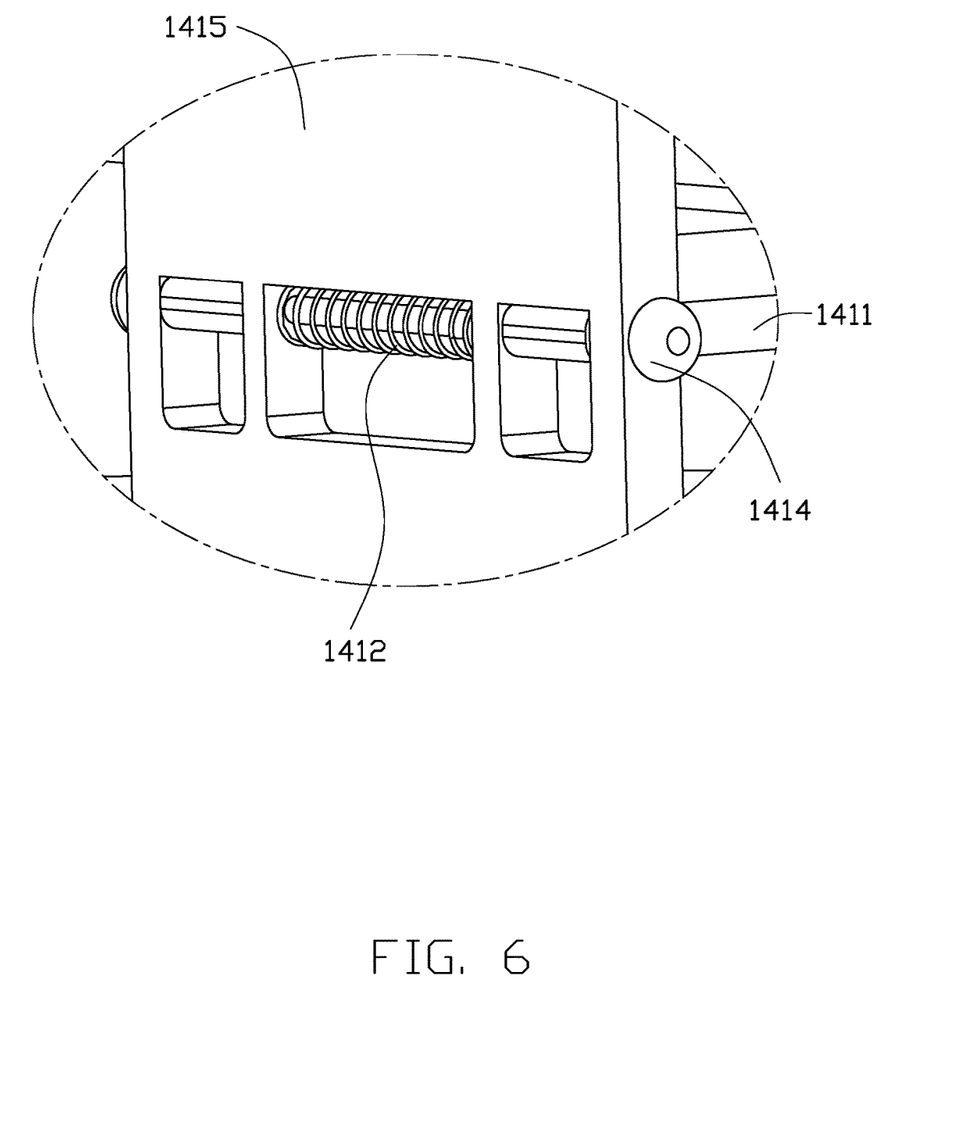
FIG. 6 is an enlarged view of circled area VI of FIG. 5.

Referring to FIGS. 5-6, in at least one embodiment, the number of the baffle mechanisms 141 is two, the two baffle mechanisms 141 rest on two sides 1424 of the plate body 142. The two sides 1424 are opposite to each other. Each baffle mechanism 141 includes, but is not limited to, at least one baffle 1411, at least one torsion spring 1412, and a connecting plate 1415. The at least one baffle 1411 is rotatably set on the connecting plate 1415 through a pin 1414. The torsion spring 1412 is sleeved on the pin 1414. One end of the torsion spring 1412 connects to the baffle 1411, the other end of the torsion spring 1412 connects to the connecting plate 1415. The torsion spring 1412 is used to provide elastic force for the baffle 1411. In at least one embodiment, the plate body 142 defines a first lower surface 1421 and a first upper surface 1422. The first lower surface 1421 is opposite to the first upper surface 1422. The baffle 1411 defines a second lower surface 1418 and a second upper surface 1419. The second lower surface 1418 is opposite to the second upper surface 1419. The second upper surface 1419 of the baffle 1411 rests on the first lower surface 1421 of the plate body 142. The second lower surface 1418 of the baffle 1411 defines a first elastic sheet 1413. The first upper surface 1422 of the plate body 142 defines a second elastic sheet 1423. In at least one embodiment, each baffle mechanism 141 includes three baffles 1411 and three torsion springs 1412. Each baffle 1411 corresponds to one torsion spring 1412. One end of each torsion spring 1412 connects to corresponding baffle 1411, the other end of each torsion spring 1412 connects to the connecting plate 1415.

The mobile device 2 connects to the plate body 142 through the interface 13. When a pressure is applied on the mobile device 2, the plate bodies 142 press the baffles 1411 to rotate and the elastic members 143 are compressed. Simultaneously, the torsion springs 1412 corresponding to the rotated baffles 1411 are compressed. When the plate bodies 142 go around the corresponding baffles 1411 and the pressure applied on the mobile device 2 is released, the first upper surface 1422 of the plate bodies 142 rest on the second lower surface 1418 of the corresponding baffles 1411. Thus, the first elastic sheet 1413 on the second lower surface 1418 contacts the second elastic sheet 1423 on the first upper surface 1422. The processing unit 18 of the cleaning device 1 produces at least one trigger signal to execute one function of the function modules 15 when the first elastic sheet 1413 makes contact with the second elastic sheet 1423.

In at least one embodiment, each baffle mechanism 141 includes a sliding rail 1416 and a slider 1417. One end of the connecting plate 1415 away from the baffle 1411 is mounted on the slider 1417. The sliding rail 1416 is mounted on the bottom plate 145. The slider 1417 is mounted on the sliding rail 1416 and slides along the sliding rail 1416. In at least one embodiment, the cleaning device 1 further includes a reset mechanism 16. The reset mechanism 16 is used to drive the sliders 1417 of the two baffle mechanisms 141 away from each other to break the contact between the baffle 1411 and the plate body 142. Thus, the plate body 142 returns to its original state under the action of the at least two elastic members 143.

Referring to FIG. 4, the reset mechanism 16 includes a push button 161, a rack 162, a gear 163, a reset spring 164, and a screw rod 165. The screw rod 165 connects to the sliders 1417 of the two baffle mechanisms 141. The push button 161 passes through the top cover 11 and extends from the top cover 11 (referring to FIG. 1). The rack 162 includes a first end 1621 and a second end 1622. The push button 161 connects to the first end 1621 of the rack 162. The second end 1622 of the rack 162 connects to the reset spring 164. The reset spring 164 is mounted on the bottom plate 145. The reset spring 164 provides elastic force for the push button 161. The rack 162 is vertically engaged with the gear 163. The gear 163 connects to the screw rod 165. When the push button 161 is pressed, the push button 161 drives the rack 162 downward and the reset spring 164 is compressed. The rack 162 drives the gear 163 to rotate along a default direction. The default direction can be clockwise or counterclockwise. The gear 163 drives the screw rod 165 to rotate when the gear 163 rotates along the default direction. Thus, the two sliders 1417 mounted on the screw rod 165 move away from each other along the screw rod 165 to move the baffle 1411 of each baffle mechanism 141 away from the plate body 142. When the pressure applied on the push button 161 is released, the rack 162 connected to the push button 161 moves upward under the driving of the reset spring 164. Thus, the rack 162 drives the gear 163 to rotate along a direction opposite to the default direction to bring together the two sliders 1417 mounted on the screw rod 165. Thus, the baffle 1411 of each baffle mechanism 141 rests on the plate body 142 again.

Figure 3:
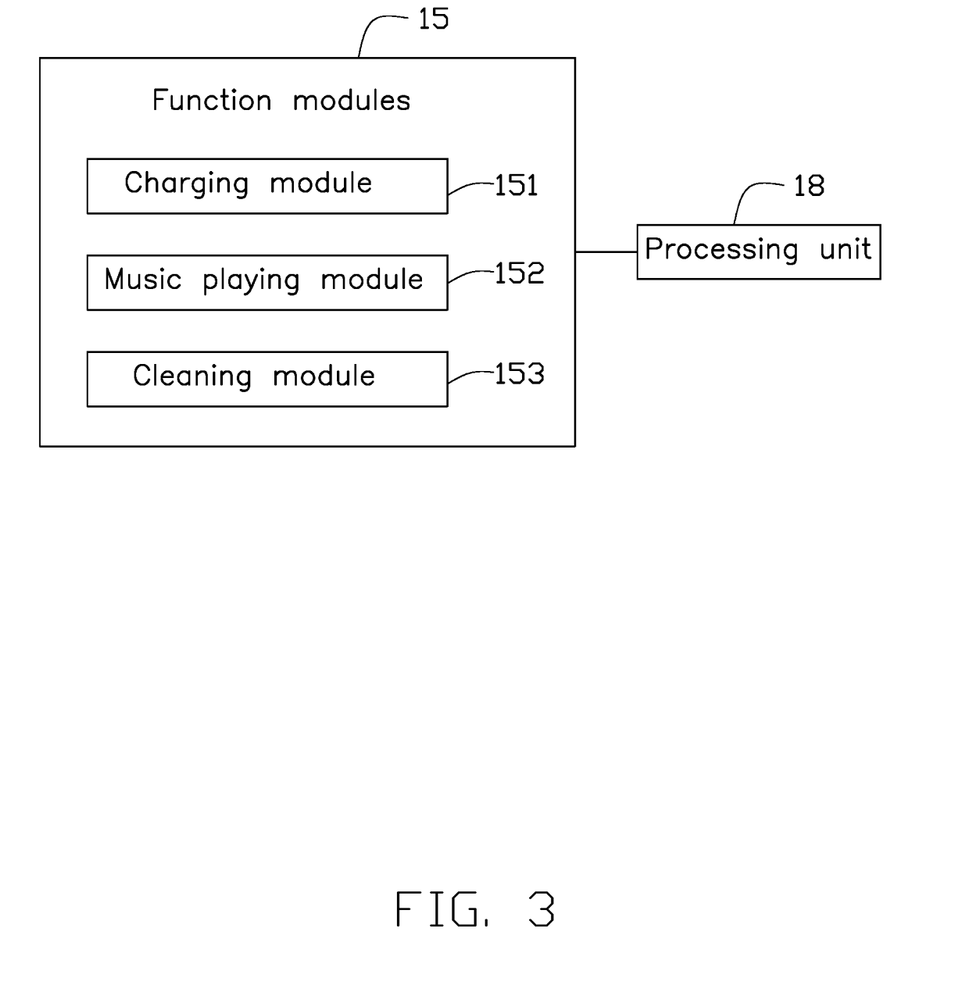
FIG. 3 is a block diagram of one exemplary embodiment of the cleaning device.
Figure 7:
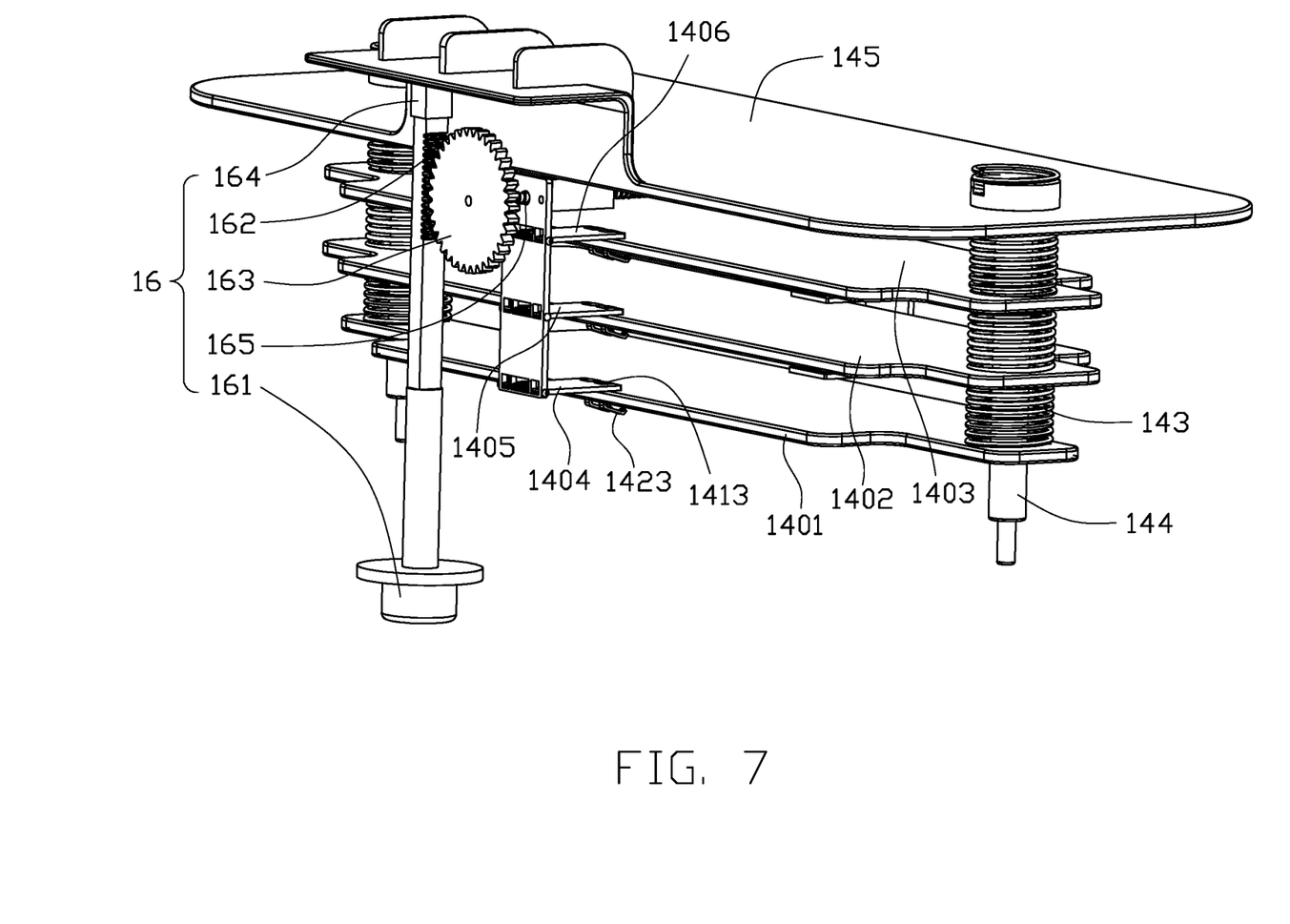
FIG. 7 is a third view of the trigger mechanism of FIG. 4.

Referring to FIG. 3, the function modules 15 include a charging module 151, a music playing module 152, and a cleaning module 153. In at least one embodiment, the trigger mechanism 14 includes three plate bodies 142 (referring to FIG. 7) and three baffles 1411. The three plate bodies 142 are respectively marked a first plate body 1401, a second plate body 1402, and a third plate body 1403. The three baffles 1411 are respectively marked a first baffle 1404, a second baffle 1405, and a third baffle 1406. In the initial state, the lower surface of the first plate body 1401 rests on the upper surface of the first baffle 1404, the lower surface of the second plate body 1402 rests on the upper surface of the second baffle 1405, and the lower surface of the third plate body 1403 rests on the upper surface of the third baffle 1406. When the mobile device 2 connects to the interface 13, a first pressure is exerted on the mobile device 2 to drive the first plate body 1401 to go around the first baffle 1404. When the first pressure applied on the mobile device 2 is released, the upper surface of the first plate body 1401 rests on the lower surface of the first baffle 1404 to make the first elastic sheet 1413 of the first baffle 1404 contact the second elastic sheet 1423 of the first plate body 1401. When the first elastic sheet 1413 of the first baffle 1404 contacts the second elastic sheet 1423 of the first plate body 1401, the processing unit 18 produces a first trigger signal to control the charging module 151 to charge the mobile device 2. When a second pressure, which is greater than the first pressure, is applied on the mobile device 2, the first plate body 1401 is driven to go around the first baffle 1404 and the second plate body 1402 is driven to go around the second baffle 1405. When the second pressure applied on the mobile device 2 is released, the upper surface of the first plate body 1401 rests on the lower surface of the first baffle 1404 to make the first elastic sheet 1413 of the first baffle 1404 contact the second elastic sheet 1423 of the first plate body 1401, and the upper surface of the second plate body 1402 rests on the lower surface of the second baffle 1405 to make the first elastic sheet 1413 of the second baffle 1405 contact the second elastic sheet 1423 of the second plate body 1402. When the first elastic sheet 1413 of the second baffle 1405 contacts the second elastic sheet 1423 of the second plate body 1402, the processing unit 18 produces a second trigger signal to control the music playing module 152 to play music. When a third pressure, which is greater than the second pressure, is applied on the mobile device 2, the first plate body 1401 is driven to go around the first baffle 1404, the second plate body 1402 is driven to go around the second baffle 1405, and the third plate body 1403 is driven to go around the third baffle 1406. When the third pressure applied on the mobile device 2 is released, the upper surface of the first plate body 1401 rests on the lower surface of the first baffle 1404 to make the first elastic sheet 1413 of the first baffle 1404 contact the second elastic sheet 1423 of the first plate body 1401, the upper surface of the second plate body 1402 rests on the lower surface of the second baffle 1405 to make the first elastic sheet 1413 of the second baffle 1405 contact the second elastic sheet 1423 of the second plate body 1402, and the upper surface of the third plate body 1403 rests on the lower surface of the third baffle 1406 to make the first elastic sheet 1413 of the third baffle 1406 contact the second elastic sheet 1423 of the third plate body 1403. When the first elastic sheet 1413 of the third baffle 1406 contacts the second elastic sheet 1423 of the third plate body 1403, the processing unit 18 produces a third trigger signal to control the cleaning module 153 to perform cleaning. In at least one embodiment, the charging module 151 can be a charging power supply, the music playing module 152 can be a music player, and the cleaning module 153 can be a vacuum cleaner.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A trigger mechanism comprising:
   at least one plate body defining a first lower surface and a first upper surface opposite to the first lower surface;
   at least two elastic members connected to the at least one plate body; and
   at least one baffle mechanism resting on the at least one plate body, the at least one baffle mechanism comprising:
      at least one baffle defining a second lower surface and a second upper surface opposite to the second lower surface; and
      at least one torsion spring connected to the at least one baffle and configured to provide elastic force for the at least one baffle, wherein the at least one baffle corresponds to the at least one plate body, the second upper surface of the at least one baffle rests on the first lower surface of the corresponding plate body, the second lower surface of the at least one baffle comprises a first elastic sheet, the first upper surface of the at least one plate body comprises a second elastic sheet.

2. The trigger mechanism as recited in claim 1, further comprising a connecting plate, wherein the at least one baffle connects to the connecting plate through a pin, the torsion spring is sleeved on the pin, one end of the torsion spring connects to the baffle, the other end of the torsion spring connects to the connecting plate.

3. The trigger mechanism as recited in claim 2, further comprising a sliding rail and a slider, wherein the connecting plate is mounted on the slider, the slider is mounted on the sliding rail and slides along the sliding rail.

4. The trigger mechanism as recited in claim 3, wherein the trigger mechanism comprises three plate bodies and two baffle mechanism, the three plate bodies are laminated through the two elastic members, each plate body comprises two sides, the two baffle mechanisms respectively rests on the two sides of the three plate bodies.

5. The trigger mechanism as recited in claim 4, wherein the baffle mechanism comprises three baffles and three torsion springs, each torsion spring corresponds to one baffle, the three baffles respectively connect to the connecting plate, one end of each torsion spring connects to the corresponding baffle, the other end of each torsion spring connects to the connecting plate.

6. A device comprising:
   an interface configured to connect a mobile device;
   a plurality of function modules;
   a processing unit configured to execute function of the pluralities of function modules; and
   a trigger mechanism comprising:
      at least one plate body defining a first lower surface and a first upper surface opposite to the first lower surface;
      at least two elastic members connected to the at least one plate body; and at least one baffle mechanism resting on the at least one plate body, the at least one baffle mechanism comprising:
      at least one baffle defining a second lower surface and a second upper surface opposite to the second lower surface; and
      at least one torsion spring connected to the at least one baffle and configured to provide elastic force for the at least one baffle, wherein the interface is mounted on the first upper surface of the at least one plate body, the at least one baffle corresponds to the at least one plate body, the second upper surface of the at least one baffle rests on the first lower surface of the corresponding plate body, the second lower surface of the at least one baffle comprises a first elastic sheet, the first upper surface of the plate body comprises a second elastic sheet, when a pressure is applied on the mobile device, the at least one plate body is driven to press the corresponding baffle to rotate, the first elastic sheet on the second lower surface contacts the second elastic sheet on the first upper surface after the pressure is released, the processing unit produces at least one trigger signal to execute function of the function modules when the first elastic sheet contacts the second elastic sheet.

7. A device as recited in claim 6, further comprising a connecting plate, wherein the at least one baffle connects to the connecting plate through a pin, the torsion spring is sleeved on the pin, one end of the torsion spring connects to the baffle, the other end of the torsion spring connects to the connecting plate.

8. A device as recited in claim 7, further comprising a sliding rail and a slider, wherein the connecting plate is mounted on the slider, the slider is mounted on the sliding rail and slides along the sliding rail.

9. A device as recited in claim 8, further comprising a reset mechanism, wherein the reset mechanism is configured to drive the slider to move to make the at least one baffle not contact the corresponding plate body.

10. A device as recited in claim 9, wherein the reset mechanism comprises a rack, a gear, and a screw rod, the screw rod connects to the slider, the rack is vertically engaged with the gear, the gear connects to the screw rod and is configured to drive the screw rod to rotate.

11. A device as recited in claim 10, wherein the reset mechanism further comprises a push button and a reset spring, the rack comprises a first end and a second end, the push button connects to the first end of the rack, the second end of the rack connects to the reset spring, the push button is configured to drive the rack to move, the reset spring is configured to provide elastic force for the push button.

12. A device as recited in claim 7, wherein the trigger mechanism comprises three plate bodies and two baffle mechanism, the three plate bodies are laminated through the two elastic members, each plate body comprises two sides, the two baffle mechanisms respectively rest on the two sides of the three plate bodies.

13. A device as recited in claim 12, wherein the baffle mechanism comprises three baffles and three torsion springs, each torsion spring corresponds to one baffle, the three baffles respectively connect to the connecting plate, one end of each torsion spring connects to the corresponding baffle, the other end of each torsion spring connects to the connecting plate, the three plate bodies are marked a first plate body, a second plate body, and a third plate body, the three baffles are marked a first baffle, a second baffle, and a third baffle, the lower surface of the first plate body rests on the upper surface of the first baffle, the lower surface of the second plate body rests on the upper surface of the second baffle, the lower surface of the third plate body rests on the upper surface of the third baffle.

14. A device as recited in claim 13, wherein the plurality of function modules comprise a charging module, a music playing module, and a cleaning module, when the mobile device connects to the interface and a first pressure is exerted on the mobile device to make the first elastic sheet of the first baffle contact the second elastic sheet of the first plate body, the processing unit produces a first trigger signal to control the charging module to charge the mobile device.

15. A device as recited in claim 14, wherein when a second pressure is applied on the mobile device to make the first elastic sheet of the second baffle contact the second elastic sheet of the second plate body, the processing unit produces a second trigger signal to control the music playing module to play music.

16. A device as recited in claim 14, wherein when a third pressure is applied on the mobile device to make the first elastic sheet of the third baffle contact the second elastic sheet of the third plate body, the processing unit produces a third trigger signal to control the cleaning module to perform cleaning.

17. A device as recited in claim 15, wherein the second pressure is greater than the first pressure.

18. A device as recited in claim 16, wherein the third pressure is greater than the second pressure.

\* \* \* \* \*